United States Patent [19]

Hse

[11] 4,209,433
[45] Jun. 24, 1980

[54] METHOD OF BONDING PARTICLE BOARD AND THE LIKE USING POLYISOCYANATE/PHENOLIC ADHESIVE

[75] Inventor: Chung-Yun Hse, Pineville, La.

[73] Assignee: The United States of America as represented by the Secretary of Agriculture, Washington, D.C.

[21] Appl. No.: 970,944

[22] Filed: Dec. 19, 1978

[51] Int. Cl.$^2$ .............................................. C08L 61/10
[52] U.S. Cl. ................................. 260/29.3; 156/62.2; 264/109; 264/128; 525/504
[58] Field of Search ............... 260/29.3; 428/424, 529; 528/132; 156/62.2, 335; 264/109, 122, 29.2 TN, 128

[56] References Cited

U.S. PATENT DOCUMENTS

| | | | |
|---|---|---|---|
| 3,636,199 | 1/1972 | Jenks et al. | 264/134 |
| 3,903,041 | 9/1975 | Bornstein | 260/29.3 |
| 3,919,017 | 11/1975 | Shoemaker | 156/62.2 |
| 4,086,125 | 4/1978 | Vasishth et al. | 428/529 X |

*Primary Examiner*—Theodore E. Pertilla
*Attorney, Agent, or Firm*—M. Howard Silverstein; David G. McConnell

[57] ABSTRACT

A method of forming particle board characterized by the use of an adhesive comprising a polyisocyanate and a phenolic adhesive. Enhanced adhesive characteristics and other advantages are associated with the method in which the polyisocyanate is added to the wood particles, etc. prior to application of the phenolic adhesive.

7 Claims, No Drawings

METHOD OF BONDING PARTICLE BOARD AND THE LIKE USING POLYISOCYANATE/PHENOLIC ADHESIVE

BACKGROUND OF THE INVENTION

I. Field of the Invention

This invention relates generally to a method of forming particle board and the like, using an exterior grade resin adhesive, specifically a polyisocyanate and a phenolic, e.g., phenol/formaldehyde adhesive.

II. Description of the Prior Art

Phenolic resole resins prepared by the alkaline condensation of a phenol and formaldehyde such as disclosed in U.S. Pat. Nos. 2,360,376 to VanEpps, 2,437,981 to Stephan, and 2,457,493 to Redfern have long been used in plywood adhesive technology. Similar basic formulations and technology has been employed in formulation of an economical fast-cure phenolic resin for exterior hardwood flakeboard, such as described by Chung-Yun Hse in *Formulation of an Economical First Cure Phenolic Resin for Exterior Hardwood Flakeboard*, Proceedings of the Ninth Particleboard Symposium, Washington State University, Pullman, Washington, 1975.

It has also been shown that the wide variation in hardwood density and process variables, such as moisture content of wood chips or flakes significantly affects resin performance. Additionally, it has been noted that the wood absorbs water from the adhesive glue during the mat forming process. Thus, with highly absorbent hardwood species such as, for example, the oaks, rapid dehydration of the glue line occurs with resultant inadequate glue flow and penetration during the subsequent hot press cure cycle. With a less absorptive species, such as, for example, sweetgum, an aqueous glue line dries more slowly, thereby causing unacceptable flow and penetration during hot pressing. Either of these latter conditions causes a substandard flakeboard.

Advantageously, a good hardwood flakeboard adhesive must not only be capable of producing specification-grade flakeboard over a broad range of wood species and density, but must also be tolerant of the variable wood absorptivity. The adhesive should also be characterized by tolerance of high flake moisture content and temperature, high temperature and humidity of the working area, low resin application, and press pre-cure time, etc.

Various adhesives and adhesive compositions have been previously proposed for use in fabricating flake board, particle board and the like, for example U.S. Pat. No. 3,919,017 to Phillip D. Shoemaker et al discloses the bonding of cellulosic materials to form particle board and the like with a binder system comprising an organic polyisocyanate and formaldehyde. The use of this adhesive system is said to allow the cellulosic materials containing up to about 22% moisture to be pressure consolidated without predrying. With regard to this combined adhesive of a polyisocyanate and formaldehyde, the patentees suggest that the binder system components can be separately added, although the order of addition is unimportant and the components may be added simultaneously. The patentees further indicate that typical adhesive systems for fabrication of particle board have included such thermosetting resins as phenolformaldehyde resorcinol-formaldehyde, melamine-formaldehyde and others.

U.S. Pat. No. 3,440,189 to John Arthur Sharp discloses the fabrication of particle board using as the adhesive a thermoset adhesive containing an organic polyisocyanate and "Vinsol" resin. The "Vinsol" resin is described as a resinous hydroxyl group containing component derived from pine wood. The use of this combination adhesive is said to produce a water resistant particle board suitable for outdoor applications.

Other U.S. Pat. Nos. which show typical adhesive compositions for the fabrication of particle board and the like include: 3,821,056 to Joseph Edward Wierden-polyisocyante/polyol reaction product; 3,632,734 to John G. Haygreen-application of phenol/formaldehyde resin to green particles; 3,736,275 to Nicholas J. Iamnarino-Xanthomonas hydrophilic colloid and cross linking agent; 3,874,990 to Lyle V. Surdyk-flame retardant phosphoric acid-dicyandiamide formaldehyde resin; and 3,968,308 to Aldoph Buschfeld et al-a phenol or urea condensation resin.

Typical processes for fabricating particle board and the like are shown in the foregoing patents as well as the following: U.S. Pat. Nos. 3,492,388 to J. England-Kanusel; 3,557,263 to Allen A. Marra; 3,649,396 to B. J. Carlsson and 3,899,559 to Fred E. Johnanson et al.

In an environment unrelated to the fabrication of particle board and the like, the combination of a polyisocyanate and a formaldehyde condensate has been proposed. Thus U.S. Pat. No. 3,268,467 to Grover W. Rye et al proposes the blocking of a polyisocyanate with a formaldehyde condensate resin in bonding a rubber reinforcing element to rubber, such as for example in bonding rayon, nylon, dacron or a metal such as steel to rubber in the tire industry.

SUMMARY OF THE INVENTION

In accordance with the present invention a method is provided whereby an improvement is achieved in the fabrication of particle board and the like. This method involves the use of an adhesive system which comprises a polyisocyanate as a minor component and, as the major component, a phenolic resin e.g., a phenol-formaldehyde condensation product. The polyisocyanate is present in the amount of from about 10 to about 50% by weight of the adhesive and the phenol-formaldehyde condensation product is present in an amount of from about 50 to about 90% by weight.

To achieve the advantages of the method of the present invention, the polyisocyanate is applied to the wood furnish prior to the application of the phenolic resin. Thereafter, the combined adhesive is reacted by heating in situ to obtain an improved thermosetting adhesive resin and the attended advantages in the environment of the present invention.

In accordance with the method of the present invention the prior application of the polyisocyanate creates enhanced adhesive characteristics as well as improved tolerance of the adhesive to wood species and process variables.

DESCRIPTION OF THE PREFERRED EMBODIMENT

The method of the present invention utilizes an adhesive composition comprising a minor amount of polyisocyanate and a major amount of a phenolic resin in the fabrication of particle board and the like.

The expression "particle board and the like" as used throughout is meant to embrace those boards known as particle board, chipboard, wafferboard and fiberboard as well as other similar names wherein the board is prepared by application of an adhesive to cellulosic particles, chips or fibers, specifically wood particles, chips and fibers and subsequently formed into the desired board through application of heat and pressure. While reference will be made generally to particle board throughout the remainder of this application, it should be understood that this invention is applicable to other equivalent forms of this type of product. Similarly, the method of the present invention and its attended advantages can be achieved with respect to various forms of cellulosic starting material and is not limited to any particular form. The use of wood chips, however, in the formation of a typical particle board comprises the preferred environment for the method of the present invention.

The method of the present invention utilizes an adhesive composition which comprises a polyisocyanate and a phenolic resin. Generally, the polyisocyanates employed in the method of the present invention are those which have an isocyanato group functionality of at least about two. Preferably, this functionality ranges from 2.3 to 3.5 with an isocyanate equivalent of 132 to 135. The isocyanato functionality can be determined from the percent available NCO groups and the average molecular weight of the polyisocyanate composition. The percent available NCO groups can be determined by the procedures of ASTM test method D1638.

Suitable polyisocyanates may be commercially obtained in several viscosity or molecular grades. The polyisocyanates which can be employed in the method of the present invention can be those that are typically employed in adhesive compositions, including typical aromatic, aliphatic and cycloaliphatic polyisocyanates. Representative aromatic polyisocyanates include 2,4-tolylene diisocyanate, 2,6-tolylene diisocyanate, 4,4'-methylene bis(phenyl isocyanate), 1,3-phenylene diisocyanate, triphenylmethane triisocyanate, 2,4,4'-triisocyanatodiphenyl ether, 2,4-bis(4-isocyanatobenzyl) phenylisocyanate and related polyaryl polyiscocyanates, 1,5-naphthalene diisocyanate and mixtures thereof. Representative aliphatic polyisocyanates include hexamethylene diisocyanate, xylylene diisocyanate, 1,12-dodecane diisocyanate and lysine ethyl ester diisocyanate. Representative cycloaliphatic polyisocyanates include 4,4'-methylenebis(cyclohexyl isocyanate), 1,4-cyclohexylene diisocyanate, 1-methyl-2,4-cyclohexylene diisocyanate and 2,4-bis(4-isocyanatocyclohexylmethyl) cyclohexyl isocyanate. Particularly suitable in the present invention is polymethylene polyphenyl isocyanate, with a functionality of about 2.7. The polyisocyanate is applied in its liquid form; preferably polymethylene polyphenyl isocyanate having a viscosity of about 200 to 275 cps at 25° C.

The major component of the resin composition utilized in the method of the present invention is a phenolic resin. The term "phenolic resin" refers to the products resulting from the reaction of phenols with aldehydes. In addition to phenol itself, cresols, xylenols, p-tertbutylphenol, p-phenylphenol and the like may be used as the phenol component. Formaldehyde is the most common aldehyde, but acetaldehyde, furfuraldehyde and the like may also be used. These resins are fully described in the Kirk-Othmer Encyclopedia, Volume 15, Pages 176 to 207.

The phenolic resin preferably used in the method of the present invention is obtained by the alkaline condensation of phenol and formaldehyde as an aqueous dispersion and has 40% to 45% resin solid with a pH of 9.5 to 11.5 and a viscosity of 200 to 325 cps at 25° C.

Generally, when a phenol-formaldehyde resin is used as the phenolic resin it is present in the adhesive composition used in the method of the present invention within the range of about 50 to 90% by weight, preferably within the range of about 70 to 80% by weight of the total amount of adhesive. Generally, the polyisocyanate is present in an amount of about 10% to 50%. In these amounts a significant increase in bond strength is obtained in accordance with the present invention.

The most preferred composition for use in the method of the present invention comprises 70 to 80% by weight phenolformaldehyde resin and 20 to 30% by weight polyisocyanate. When the adhesive system is used according to these percentages, one achieves a commercially attractive combination of desired board properties and economic advantages.

In the method of the present invention, the adhesive system, as previously described, is ordinarily applied to wood particles or wood fibers (collectively and alternatively referred to as wood furnish), by standard techniques. To achieve the advantages of the present invention, in application of the adhesive system, it is necessary that the polyisocyanate be applied to the wood furnish prior to application of the phenolic resin. Such application sequence imparts enhanced strength characteristics to the resulting particle board as compared to simultaneous application of the polyisocyanate and phenolic resin or application of the phenolic resin prior to the polyisocyanate.

It has been discovered that upon initial application, the polyisocyanate reacts readily with hydroxyl groups or water on the surface of or among the wood particles to form strong molecular bonding. Subsequently, a cross-linking reaction between isocyanate groups and the phenolic resin occurs upon the introduction of the phenolic resin, thereby reinforcing the functionalities of the phenolic adhesive. The initial rapid reaction of the polyisocyanate gives the combined resin system its improved tolerance to wood species and process variables.

The method of the present invention and the attended advantages are not dependent upon the particular method utilized in the fabrication of the particle board, except, of course, the requirement that the polyisocyanate be applied prior to the phenolic resin. Accordingly, any of the prior art methods illustrated in the patents previously recited can be utilized. In general, the method for fabricating the particle board involves the application of the adhesive composition, polyisocyanate first, to the wood chips with subsequent application of heat and pressure to form the board into its desired configuration. It should be appreciated that the adhesive composition can be applied to the wood chips in any conventional means such as spray coating, coating or other dispersion of the adhesive and wood.

In a typical process of fabricating particle board a first layer of wood chips and adhesive is generally layed down on a caul plate. This first layer is termed the face mix and forms the face of the finished particle board. After the face mix is layed on the caul a second layer of wood chips and adhesive is then layed down on top of the face mix. This second layer is termed the core mix since it will form the core of the finished particle board. Following this a third layer of wood chips and adhesive is layed down on top of the core mix. This third layer is also a face mix and will form the opposite face of the finished particle board. The three layers so layed down on the caul plate are termed the mat.

The mat, including a plurality of caul plates are loaded into a press and a pressing operation is carried out in order to form the desired particle board. By way of example a mat which has an initial thickness of about 3½ inches may be pressed down to a thickness of about 0.7 inch or a mat which has an initial thickness of 7 inches may be pressed down to a final thickness of approximately 1⅞ inches. During the pressing operation the mats are generally heated to a temperature such as 250°-400° F. as they are being compressed at about 100-600 psi. The exact conditions utilized in the pressing and heat curing of the particle board can, of course, be easily selected by one skilled in the art depending, of course, upon the desired characteristics of the final product.

When utilizing such a procedure in the fabrication of particle board it is only necessary in accordance with the present invention that each application of adhesive comprise an initial application of the polyisocyanate, followed by application of the phenolic resin. Generally, the polyisocynate is applied in its liquid form, and the resin as an aqueous dispersion.

Furthermore, although in accordance with the present invention the application of the phenolic resin after the polyisocyanate application significantly minimizes the binding of wood particles to the caul plates, it is generally preferred to apply a typical release agent such as for example, glycerin or wax emulsion on the caul plates to minimize any sticking. This, of course, is conventional in the formation of particle board using the caul plate technique.

As indicated previously, when utilizing the method of the present invention the particular wood starting material is not critical and, enhanced wood tolerance is achieved by the present method. Accordingly, any type of species of wood is suitable for preparing the particleboard of the present invention including both hard and soft woods with high density woods and low density woods being suitably applicable.

When carrying out the method of the present invention, the amount of adhesive can be that amount which is typically utilized in fabrication of particle board. Generally, it has been found that effective fabrication of particle board is achieved with an adhesive spread rate of about 3 to about 6% by weight based upon the dry wood weight of the wood furnish. Here again, however, amounts both above and below this range can be tolerated in preparing particle boards having outstanding characteristics.

The method of the present invention will now be illustrated by the following examples which are in no way intended to limit the invention.

In the examples the materials utilized were prepared as follows:

Preparation of the Phenol-formaldehyde Resin

Table I lists the formulation used in preparing the phenol-formaldehyde resin.

TABLE I

| Ingredients | Parts Per Thousand |
| --- | --- |
| First 37% formaldehyde | 316 |
| Water | 234 |
| 90% phenol | 280 |
| 50% sodium hydroxide | 96 |
| Second 37% formaldehyde | 74 |

To prepare each resin, the first formaldehyde portion, all of the phenol and water was placed in the reaction kettle. The sodium hydroxide was added as a catalyst at a rate of 20 ml every ten minutes to gradually increase the pH from about 8.5 to about 10.5. At the end of the sodium hydroxide addition, the reation mixture was heated and maintained at 95° to 100° C. The second formaldehyde component was added after 2.5 hours of reaction time. When the viscosity reached the Gardner-Holt viscosity C the temperature was reduced to 70° C. When viscosity reached the Garner-Holt viscosity H the reaction was terminated by rapidly cooling the mixture to 25° C.

Particleboard Construction Conditions

Table II lists the typical conditions and characteristics of particle boards manufactured in the following examples.

TABLE II

| | |
| --- | --- |
| Panel density: | 46 lb/cu. ft. |
| Panel thickness: | ½ inch. |
| Resin content: | 4% |
| Hot press temperature: | 300° F. |
| Hot press time: | 4.5 minutes |

All wood flakes or chips were produced by a shaping-lathe headrig with average flake dimension of 3 inches long by 0.015 inch thick and random width. The mixed hardwood flakes consist of 40% sweetgum (Liquidambar styraciflua L.) and 60% southern red oak (Quercus falcata Michx.).

EXAMPLE I

A series of flake or particle boards are fabricated according to the following adhesive blending processes:
(1-A) applying polyisocyanate prior to the phenol-formaldehyde resin adhesive;
(1-B) Applying polyisocyanate and phenol-formaldehyde resin adhesive simultaneously;
(1-C) Applying phenol-formaldehyde resin adhesive prior to the polyisocyanate.

Both phenol-formaldehyde resin and polyisocyanate are applied by conventional air-atomizing nozzles in a rotating drum-type blender. Of the total amount of adhesive, the phenol-formaldehyde resin constitutes 75 percent and the polyisocyanate constitutes 25 percent. Standard internal bond specimens measuring 2 by 2 inches are cut from the final product and tested in accordance with ASTM Standards for evaluating the properties of wood-bare fiber and particle panel materials (ASTM D-1037-64).

Table 3 gives typical results of adhesive bond strength in pounds per square inches of Example 1.

TABLE 3

Relationships between adhesive blending process and integral bond strength (Example 1)

| Test | Adhesive blending process | Internal bond psi |
| --- | --- | --- |
| 1-A | Polyisocyanate* prior to phenolic** | 127 |
| 1-B | Polyisocyanate* and phenolic | 89 |

TABLE 3-continued

Relationships between adhesive blending process and integral bond strength (Example 1)

| Test | Adhesive blending process | Internal bond psi |
|---|---|---|
| 1-C | simultaneously<br>Phenolic prior to<br>polyisocyanate* | 67 |

*polymethylene polyphenyl isocyanate - functionality about 2.7
**as prepared above based on Table I The significantly higher internal bond with the method of the applying polyisocyanate prior to the phenolic resin is evident. No significant difference is observed in these tests between the processes of spraying phenolic resin prior to polyisocyanate and that of the polyisocyanate and phenolic resin simultaneously.

EXAMPLE 2

Evidence as shown in Example 1 of the superior performance of method of applying the polyisocyanate prior to the phenol-formaldehyde resin leads to the study of the constituent ratio of polyisocyanate to phenol-formaldehyde resin. The following test conditions are investigated.

TABLE 4

| | Ratio of Polyisocyanate to Phenolic Resin | |
|---|---|---|
| | Polyisocyanate, % | Phenolic Resin, % |
| (2-A) | 0 | 100 |
| (2-B) | 10 | 90 |
| (2-C) | 20 | 80 |
| (2-D) | 30 | 70 |
| (2-E) | 40 | 60 |
| (2-F) | 50 | 50 |
| (2-G) | 60 | 40 |

The panel fabrication and testing are similar to that of Example 1 except the hot press time is 5.5 minutes and total resin content is 5 percent. Typical internal bond strengths are given in Table 5.

TABLE 5

Effects of Constituent Ratio of Polyisocyanate to Phenolic Resin on Internal Bond Strength

| Test | Percent constituent ratio polyisocyanate/ phenolic resin | Internal bond (psi) | | |
|---|---|---|---|---|
| | | 1-A[1] | 1-B[2] | 1-C[3] |
| 2-A | 0/100 | 72 | 72 | 72 |
| 2-B | 10/90 | 99 | 83 | 75 |
| 2-C | 20/80 | 152 | 97 | 80 |
| 2-D | 30/70 | 192 | 112 | 83 |
| 2-E | 40/60 | 208 | 123 | 92 |
| 2-F | 50/50 | 216 | 131 | 100 |
| 2-G | 60/40 | 173 | 139 | 113 |

[1]1-A application of polyisocyanate prior to phenolic resin
[2]1-B application of polyisocyante and phenolic simultaneous
[3]1-C application of phenolic resin prior to polyisocyanate The superiority of the method of applying polyisocyanate prior to phenolic resin is again apparent. Also, the increased constituent ratio of polyisocyanate to phenolic resin results in increased bond strength. However, in the application of polyisocyanate prior to phenolic resin, increased amount of polyisocyanate above about 50 percent has been found to give less advantageous bond strength.

EXAMPLE 3

To measure the tolerance of the method of application under high moisture content of wood furnish, the following test conditions are chosen:

| Test | Flake Moisture Content, % | Constituent Ratio Polyisocyanate/ phenolic Resin, %/% |
|---|---|---|
| 3-A | 4 | 0/100 |
| 3-B | 4 | 10/90 |
| 3-C | 4 | 30/70 |
| 3-D | 4 | 50/50 |
| 3-E | 11 | 0/100 |
| 3-F | 11 | 10/90 |
| 3-G | 11 | 30/70 |
| 3-H | 11 | 50/50 |

The panels are prepared as described in Example 2, again using a hot press time of 5.5 minutes and total resin content of 5 percent. The average internal bond strengths of the panels are summarized in Table 6.

TABLE 6

Effects of Flake Moisture Content on Internal Bond Strength

| Test | Flake Moisture Content % | Constituent Ratio Polyisocyanate/ phenolic Resin %/% | Internal psi |
|---|---|---|---|
| 3-A | 4 | 0/100 | 72 |
| 3-B | 4 | 10/90 | 104 |
| 3-C | 4 | 30/70 | 169 |
| 3-D | 4 | 50/50 | 208 |
| 3-E | 11 | 0/100 | 0 |
| 3-F | 11 | 10/90 | 72 |
| 3-G | 11 | 30/70 | 135 |
| 3-H | 11 | 50/50 | 174 |

Table 6 clearly demonstrates the superiority of applying polyisocyanate prior to phenolic resin over phenolic resin alone (Tests 3-A and 3-E). It is noted that satisfactory bond strength is obtained for the flake with high moisture content at 11 percent by applying as little as 10 percent of polyisocyanate prior to the phenolic, whereas in a conventional phenolic resin system steam generated from high moisture content flakes during the hot press cycle results in panel delamination.

EXAMPLE 4

The high wood density of hardwood species such as oaks and hickory has contributed to the difficulty in fabrication of low density panels. To measure the tolerance of the present adhesive system to the high density hardwood species, particles boards made from southern red oak with the following variables are investigated:

| Test | Panel Density pcf | Constituent Ratio Polyisocyanate/ phenolic Resin %/% |
|---|---|---|
| 4-A | 41 | 0/100 |
| 4-B | 41 | 20/80 |
| 4-C | 45 | 0/100 |
| 4-D | 45 | 20/80 |
| 4-E | 49 | 0/100 |
| 4-F | 49 | 20/80 |

4-A, 4-C, and 4-E panels are fabricated with conventional phenol-formaldehyde resin adhesive without polyisocyanate, whereas 4-B, 4-D, and 4-F panels are fabricated according to the present invention, i.e., applying polyisocyanate prior to phenolic resin. The constituent ratio of polyisocyanate to phenolic resin is maintained at 20/80 in 4-B, 4-D and 4-F. The hot press time and total resin content is 5.5 minutes and 5 percent, respectively. The panels are prepared and tested as described in Example 1. Table 7 gives the typical internal bond strength in pounds per square inch.

TABLE 7
Internal Bond Strength of Southern Red Oak Panels

| Test | Panel Density pcf | Constituent Ratio Polyisocyanate/ Phenolic Resin %/% | Internal Bond psi |
|---|---|---|---|
| 4-A | 41 | 0/100 | 21 |
| 4-B | 41 | 20/80 | 84 |
| 4-C | 45 | 0/100 | 44 |
| 4-D | 45 | 20/80 | 124 |
| 4-E | 49 | 0/100 | 92 |
| 4-F | 49 | 20/80 | 116 |

The panels fabricated according to the method of the present invention yield consistently higher internal bond strength. It is noted that satisfactory panels are produced even at low panel density of 41 pounds per cubic foot which is not possible with the conventional phenolic resin system.

EXAMPLE 5

In the manufacture of particle board panels, the resin content level not only strongly affects panel performance but also is the most expensive single item in the manufacturing cost. To measure the efficiency of the adhesive system of the present invention, the following test conditions are investigated:

TABLE 8
Relationship of Resin Content and Internal Bond Strength

| Test | Resin Content % | Constituent Ratio Polyisocyanate Phenolic Resin %/% | Internal Bond psi |
|---|---|---|---|
| 5-A | 3 | 0/100 | 43 |
| 5-B | 3 | 20/80 | 71 |
| 5-C | 4 | 0/100 | 56 |
| 5-D | 4 | 20/80 | 139 |
| 5-E | 5 | 0/100 | 68 |
| 5-F | 5 | 20/80 | 152 |

The 5-A, 5-C, 5-E panels are fabricated with conventional phenol-formaldehyde resin adhesive without polyisocyanate while 5-B, 5-D, and 5-F panels are fabricated according to the present invention, i.e., applying polyisocyanate prior to phenolic resin; the constituent ratio of polyisocyanate to phenolic resin is maintained at 20/80. The hot press time and panel density are 5.5 minutes and 44 pcf, respectively. The panels are prepared and tested as described in Example 1. Typical internal bond strengths are given in Table 8.

The superiority of the resin system containing polyisocyanate is again apparent for all resin content levels in the test.

These tests confirm the unexpected superiority of applying polyisocyanate prior to the phenolic resin in fabrication of particle board and the like. The tests also confirm the improvement of the method of the present invention when called upon for use under adverse veneer moisture content conditions and resin content levels. Satisfactory particle boards are formed from high density species such as southern red oak at significantly lower panel density which is not attainable with conventional methods and systems.

While the invention disclosed herein has been described with reference to preferred embodiments and representative examples thereof, the invention is not deemed to be so limited. Accordingly, modifications to the present method may be made while still falling within the intent and scope of the invention.

What is claimed is:

1. In a method of fabricating particle board and the like, wherein an organic polyisocyanate/phenolic resin adhesive is applied to wood furnish with subsequent application of heat and pressure to form the desired product, the improvement comprising the steps of:
   applying said polyisocyanate/phenolic resin adhesive wherein said adhesive comprises:
   (i) from about 10% to about 50% by weight of the organic polyisocyanate; and
   (ii) from about 50% to about 90% by weight of the phenolic resin;
   wherein said application comprises the steps of:
   (a) applying first to the wood furnish the organic polyisocyanate; and
   (b) applying next to the wood furnish the phenolic resin; and
   applying next to the resulting wood furnish/adhesive product sufficient heat and pressure to form the desired product.

2. The method of claim 1, wherein said adhesive is applied in an amount of about 3 to about 6% dry weight based on the weight of the wood furnish.

3. The method of claim 1, wherein said phenolic resin is an alkaline condensation product of phenol and formaldehyde.

4. The method of claim 3, wherein said phenolic resin is applied as an aqueous dispersion having a resin solid content of about 40 to about 45% by weight, a pH of from about 9.5 to about 11.5 and a viscosity of from about 200 to 325 cps when measured at 25° C.

5. The method of claim 1, wherein said polyisocyanate is polymethylene polyphenyl isocyanate with an isocyanate functionality of about 2.7.

6. The method of claim 5 wherein said polyisocyanate is applied as in its liquid form having a viscosity of about 200 to 275 cps at 25° C.

7. The method of claim 1, wherein the adhesive comprises:
   (i) from about 20 to about 30% by weight of the polyisocyanate; and
   (ii) from about 70 to about 80% by weight of the phenolic resin.

* * * * *